Sept. 9, 1969  C. ALBRECHT ET AL  3,466,581
WINDING FOR A MAGNET COIL OF HIGH FIELD STRENGTH
AND METHOD OF MANUFACTURING THE SAME
Filed Aug. 1, 1967

United States Patent Office 3,466,581
Patented Sept. 9, 1969

3,466,581
WINDING FOR A MAGNET COIL OF HIGH FIELD STRENGTH AND METHOD OF MANUFACTURING THE SAME
Cord Albrecht, Erlangen, and Wilhelm Kafka, Tennenlohe, Germany, assignors to Siemens Aktiengesellschaft, a corporation of Germany
Filed Aug. 1, 1967, Ser. No. 657,642
Claims priority, application Germany, Aug. 18, 1966, S 105,409
Int. Cl. H01f 7/22
U.S. Cl. 335—299      9 Claims

ABSTRACT OF THE DISCLOSURE

A winding which is particularly adapted for use in the coil of a magnet of high field strength. The winding is composed of an electrically conductive tape having a pair of opposed side edges and a pair of opposed faces which extend between these side edges, and this electrically conductive tape is wound into a plurality of convolutions. At least one additional tape of high tensile strength is separate from but extends along one of the faces of electrically conductive tape and is situated because the convolutions thereof to separate these convolutions from each other. During the manufacture of this structure the pair of tapes are simultaneously unwound from a pair of supply spools at an adjustable tension while the tapes are wound next to each other into the convolutions where the tape of high tensile strength is situated next to the electrically conductive tape to separate the convolutions of the latter from each other.

---

Our invention relates to electromagnets.

In particular, our invention relates to electromagnets of high field strength provided with large coils.

As is well known, with magnets of this latter type radial pressures on the order of a few kp./cm.$^2$ are encountered, and considerable tangential tension forces occur within the current conductor. An increase in the cross section of the conductor to reduce the tensile stresses results in an extremely large consumption of material. Up to the present time it has been customary to protect several winding layers by way of an outer cylinder which is made of a non-magnetic material and which has a high tensile strength. These measures, however, render the winding operations considerably more difficult to carry out. Moreover, it is still possible with such constructions to encounter within parts of the windings forces which result in damaging of the current conductor.

It is accordingly a primary object of our invention to provide for the coil of a magnet of high field strength a winding which includes a electrically conductive tape which is reliably protected from excessive tensile forces.

In particular, it is an object of our invention to provide a relatively simple inexpensive structure, which does not require a large amount of material, which does not create difficulties in carrying out the winding operations, and which at the same time provides reliable protection against the tensile stresses.

In accordance with our invention the winding includes an electrically conductive tape which has a pair of opposed side edges and a pair of opposed faces which extend between these side edges, and this electrically conductive tape is wound into a plurality of convolutions. At least one spacer tape made of a material of high tensile strength extends along one of the faces of the electrically conductive tape to become situated between the convolutions thereof, thus separating these convolutions from each other, and this tape of high tensile strength is separate from the electrically conductive tape.

This tape of high tensile strength preferably takes the form of a glass fiber tape. In this way the convolutions of the electrically conductive tape are electrically insulated by the tape of high tensile strength while being protected by the latter against excessive tensile forces. Furthermore, the glass fiber tape can function as a wick in the case where cooling by vaporization is carried out, the glass fiber tape acting in this case by capillary action to deliver a refrigerating liquid directly to the electrically conductive tape. Moreover, such a glass fiber tape can be entirely or partially impregnated with a conductive or semi-conductive material, so that when dealing with superconductors there is the possibility of shunting the neighboring convolutions. However, instead of a tape of glass fibers it is also possible to use a tape composed of carbon fibers of high tensile strength.

Our invention is illustrated by way of example in the accompanying drawings which form part of this application and in which.

Figure 1:
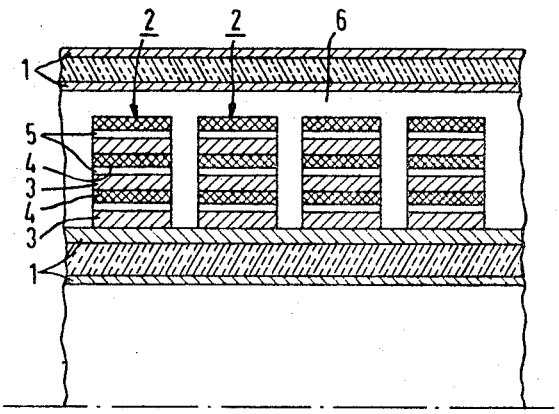
FIG. 1 is a fragmentary longitudinal sectional elevation schematically illustrating that part of a cryoconductive coil which relates to the present invention.

FIG. 1 fragmentarily illustrates the coil of a magnet of high field strength. This coil includes, in the interior of a thermally insulated ring-shaped housing 1, a winding composed of the several series of convolutions 2 which are interconnected in series in an unillustrated manner. These windings each include an electrically conductive tape 3 in the form of a cryoconductor which is spirally wound. This electrically conductive band 3 has a pair of opposed side edges and a pair of opposed faces extending between these side edges, and along one of these faces of the conductor 3 is situated a spacer tape 4 which has a poor electrical conductivity and which is made of a material of high tensile strength. The tape 4 is separate from the tape 3 while extending therealong to be spirally wound therewith in a manner separating the convolutions of the tape 3 from each other. The electrically conductive tape 3 is provided at one of its faces with transverse grooves so that axially extending passages 5 will be provided in the windings 2. The electrically conductive tape 3 may be made of ultrapure copper or aluminum, while the tape 4 can be made of a woven glass fiber material having a composition which provides the tape 4 with a coefficient of thermal expansion which is approximately equal to the coefficient of thermal expansion of the tape 3. Within the hollow space 6 in the interior of the housing 1 is a refrigerating liquid capable of refrigerating the tape 3 down to a predetermined temperature such as, for example, down to 20° K.

The tangential tensile forces which result from the radial forces are continuously absorbed by the glass fiber tape 4. The electrically conductive tape 3 therefore remains protected from mechanical stressing. The glass fiber tape operates at the same time as an electrical insulation between the individual convolutions of the windings.

Furthermore, the glass fiber tape 4 improves the refrigeration of the electrically conductive tape 3. As a result of the capillary action of the glass fiber tape the refrigerating liquid is drawn into the interior of the latter and placed thereby directly in engagement with the electrically conductive tape 3. Because of heat losses the refrigerating medium will vaporize and can escape through the passages 5. These passages 5 in the illustrated example take the form of transverse grooves. They can also be rolled into the conductor 3. Where the conductor 3 has a width of 10 mm. and a thickness of 1 mm., the grooves 5 need only have a depth and a width of approximately 0.1 mm.

Figure 2:
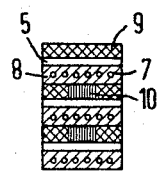
FIG. 2 is a transverse sectional illustration schematically showing the structure of part of a superconductive coil.

In the embodiment of our invention which is illustrated in FIG. 2, the winding convolutions include an electrical conductor in the form of the superconductive wires 7 which are embedded in a metal 8 of good electrical conductivity, such as copper or aluminum. The superconductive wires 7 may be made, for example, of an alloy of niobium-tin or niobium-zirconium.

The glass fiber tape 9 serves as the spacer tape of this embodiment and while being separate from the electrically conductive tape 7, 8 nevertheless extends along one of the faces thereof to separate the convolutions thereof from each other. The glass fiber tape 9 is impregnated at the locations 10, which may be spaced from each other along the tape 9, with a semiconductive material, so that there will be shunting between adjoining convolutions. This construction serves to protect the windings in the case of an inadvertent transition between the superconductive and normal conducting states. The tape 7, 8 is also formed with the transverse passages 5.

In order to improve the electrical and thermal conductivity of the structure, the superconductor 7 can be provided with a galvanic coating which covers the exterior surface of the superconductor 7 and which may be made of a material such as copper, silver, tin, or indium.

In order to embed the superconductor within the metal 8, it is possible to initially provide a pair of metal tapes between which the superconductor is sandwiched, whereupon the pair of metal tapes are rolled so as to be pressed against and joined to each other, these metal tapes thus enclosing the superconductor from both sides. If the metal tapes, prior to embedding of the superconductor therein, are provided with a galvanic coating, of the type similar to that which coats the superconductor, then corrosion layers of poor conductivity are avoided. Moreover, when such metal tapes are rolled together so as to embed the superconductive wire therein, it is possible to bring about additionally a soldering of the metal tapes to each other if a tin or indium coating is provided. Also, it is possible to enclose the superconductor within the metal tapes in such a way that the convolutions of the wire 7 itself within the metal 8 have a predetermined pitch providing for the wire 7 a somewhat twisted winding situating the wire 7 at one side of a convolution in the region of one end or side edge of the metal 8 and at another part of the convolution distant from this latter edge nearer to the other edge, and so on, so that in this way the electrical stressing of the superconductor 7 can be equalized in the manner similar to a Roebel rod. In this way lack of uniformity in the distribution of current within the individual conductors is avoided. The metal 8 of good electrical conductivity in which the superconductor is embedded is designed to be of normal electrical conductivity during operation of the superconductive coil.

Figure 3:
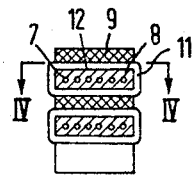
FIG. 3 is a fragmentary transverse section schematically illustrating another embodiment of coil windings of the invention, FIG. 3 being taken along line III—III of FIG. 4 in the direction of the arrows.
Figure 5:
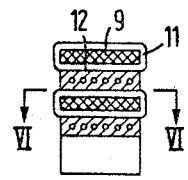
FIG. 5 is a transverse section of another embodiment of a coil winding according to our invention, FIG. 5 being taken along line V—V of FIG. 6 in the direction of the arrows.
Figure 4:
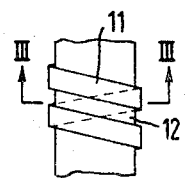
FIG. 4 is a fragmentary plan view of the structure of FIG. 3 taken along line IV—IV of FIG. 3 in the direction of the arrows.
Figure 6:
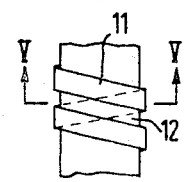
FIG. 6 is a fragmentary plan view of the structure of FIG. 5 taken along line VI—VI of FIG. 5 in the direction of the arrows.

According to the embodiment of our invention which is illustrated in FIGS. 3 and 4, as well as FIGS. 5 and 6, the passages which extend axially are not formed by transverse grooves but instead are formed by winding around one or the other of the tapes a third tape which is made of a material of high tensile strength.

Thus, in the embodiment of FIGS. 3 and 4 the electrically conductive tape 8, in which the superconductor 7 is situated, has a glass fiber tape 11 helically wound around, and the pitch of the tape 11 is greater than the transverse width thereof, so that the convolutions of the tape 11 are spaced from each other along the tape 7, 8, thus achieving passages which function similar to the passages 5. Thus, it will be seen that the transversely extending passages 12 are formed between the convolutions of the tape 11. In this case it is possible to impregnate the tensile force absorbing glass fiber tape 9 with a casting resin so that its strength is increased inasmuch as now the function of the wick is taken over by the glass fiber tape 11.

In the embodiment of our invention which is illustrated in FIGS. 5 and 6, the glass fiber tape 11 is wound in the same way around the glass fiber tape 9. In this case the glass fiber tape 9 can also be made of a conductive material, such as high quality steel, beryllium, copper, titanium, or it may be in the form of a carbon fiber tape.

The windings for the magnet coil of our invention can advantageously be manufactured according to the method of our invention. In accordance with this method the electrically conductive tape and at least one additional tape of a material of high tensile strength are separately unwound from a pair of supply spools from which both of these tapes are simultaneously unwound with an adjustable tension, and these unwound tapes are located one next to the other and coiled into the windings shown in the drawings and described above.

We claim:

1. In a coil of an electromagnet of high field strength, said coil having a winding for conducting an electric current, said winding comprising an electrically conductive tape spirally wound into a plurality of convolutions to form a disc, said conductive tape having a pair of opposed side edges and a pair of opposed faces respectively extending between said side edges, and at least one spacer tape of high tensile strength extending spirally along one of said faces of said electrically conductive tape while being separate therefrom and separating the convolutions of said electrically conductive tape from each other, whereby said spacer tape absorbs tensile stresses developed in said winding from the interaction of said current and said field.

2. In a coil according to claim 1, said spacer tape being composed of glass fibers.

3. In a coil according to claim 2, said glass fiber tape being impregnated with a semiconductive material at least at predetermined locations which are spaced from each other along said glass fiber tape.

4. In a coil according to claim 1, said spacer tape being made of high quality steel.

5. In a coil according to claim 1, said electrically conductive tape being composed of a metal of good electrical conductivity and having a superconductor embedded therein.

6. In a coil according to claim 5, said superconductor having on its exterior surface a coating of galvanic metal.

7. In a coil according to claim 1, wherein said electromagnet is immersed in a refrigerant, said winding including duct means formed at the interface of said spacer tape and said conductive tape for channelling said refrigerant therethrough.

8. In a coil according to claim 7, said duct means comprising a multiplicity of transverse grooves extending across said tape.

9. In a coil according to claim 7, said duct means comprising a glass fiber tape wound around and extending along one of said tapes, said glass fiber tape being wound at a pitch greater than its width, so that the convolutions thereof are spaced from each other along said one tape.

References Cited

UNITED STATES PATENTS

| | | | |
|---|---|---|---|
| 3,233,154 | 2/1966 | Hnilicka | 335—216 |
| 3,332,047 | 7/1967 | Borchert | 335—216 |
| 3,363,207 | 1/1968 | Brechna | 335—216 |

OTHER REFERENCES

The Review of Scientific Instruments, vol. 36, No. 6, June 1965, an article by Laverick et al., pp. 825–830.

G. HARRIS, Primary Examiner

U.S. Cl. X.R.

174—128; 335—216